Dec. 31, 1940.  D. F. STEDMAN  2,227,164
LIQUID AND VAPOR CONTACTING DEVICE
Filed April 26, 1939
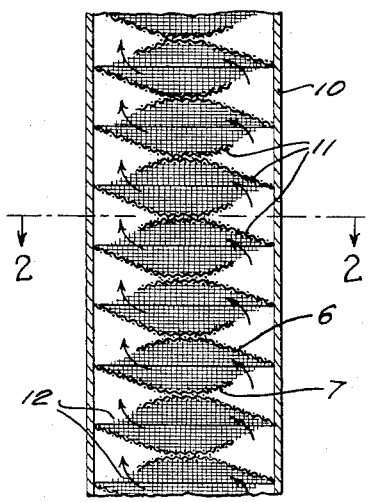
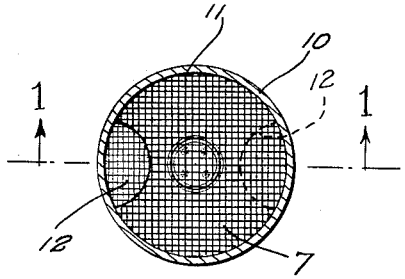
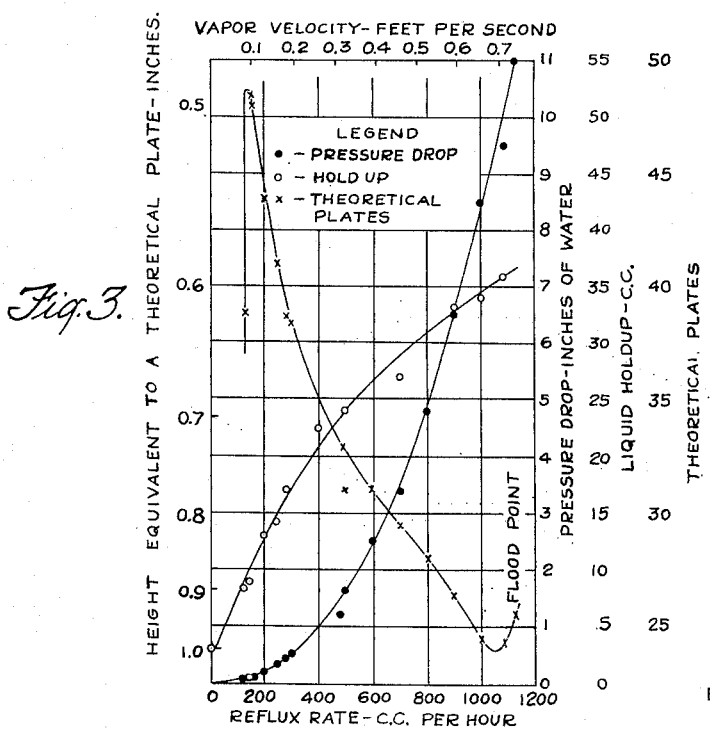
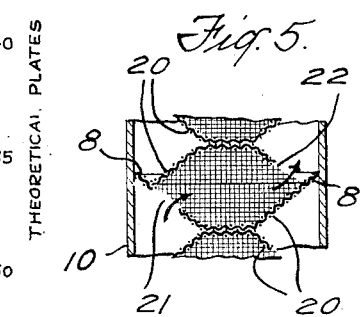
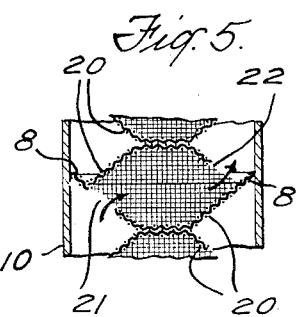
INVENTOR
DONALD F. STEDMAN.
BY
ATTORNEY Patented Dec. 31, 1940

2,227,164

UNITED STATES PATENT OFFICE 2,227,164

LIQUID AND VAPOR CONTACTING DEVICE

Donald F. Stedman, Ottawa, Ontario, Canada, assignor, by mesne assignments, to Foster Wheeler Corporation, New York, N. Y., a corporation of New York Application April 26, 1939, Serial No. 270,091

10 Claims. (Cl. 261—95)

This invention relates to contact devices and more particularly pertains to apparatus for effecting contact between liquids and vapors or gases, such as fractionating columns, scrubbers and the like.

The invention contemplates disposing, in the contacting zone, a capillary material or gauze, of such a mesh that liquid being treated will completely seal the openings, while larger openings, which are not sealed by the liquid, are provided for the passage of the vapors or gases under treatment. The capillary material is so arranged in the structure that the liquid will have a continuous path downward, and the vapor or gas a continuous path upward, each phase without hindrance by the other, and preferably with a maximum contact between the two phases. Gauze of woven wire is a satisfactory material provided the mesh openings are small enough to seal with the liquid. However, the mesh openings to be used in a particular construction will depend upon the type of liquid being treated and the amount of liquid being employed. It is desirable that the wires of the gauze project above the film of liquid in order to break and disturb its flow as much as possible, but without perforation of the seal. This is accomplished by using a wire as heavy as is feasible for the purpose intended. Thus the weave and the wire sizes are selected when forming a column having regard to maintenance of capillarity. The capillary material may be made from fabric, asbestos, glass or slag wool, plastics or similar substances capable of acting as a wick. The acid or other character of the materials to be treated shall be considered in selecting the particular capillary material to be used. Materials not sufficiently rigid in themselves require structural support to sustain the column of packing.

The invention will be understood from the following description when considered in connection with the accompanying drawing forming a part thereof, and in which:

Fig. 1 is a more or less diagrammatic view in vertical axial section of part of a contacting column embodying the invention, taken on line 1—1 of Fig. 2;

Fig. 2 is a transverse sectional view taken on line 2—2 of Fig. 1;

Fig. 3 is a chart which shows the performance of a fractionating column having packing embodying the invention;

Fig. 4 is an axial section showing more or less diagrammatically, another form of packing embodying the invention, and Fig. 5 is a view similar to Fig. 4, showing another form of the invention.

Referring to the drawing, reference character 10 designates the shell of a cylindrical column to which vapor or gas to be contacted is supplied at the lower portion thereof and to which liquid is supplied at the upper portion thereof through suitable means, not shown. As used herein, the word "vapor" is intended to include "gas." In the forms of the invention illustrated, the column is filled to the extent desired with a "packing" of capillary material so formed and arranged to provide vapor contact with thin films of liquid within the column as the vapor flows upwardly countercurrent to descending liquid. This packing as shown consists of a plurality of comparatively flat, conical-shaped discs 11 of capillary material which are welded together alternately base to base and edge to edge, as shown in Fig. 1, to provide a plurality of superposed cells through which and between which the vapor flows in contact with the thin films of liquid on the surfaces of the cells. These conical elements are usually made truncated. Each disc and cell extends throughout substantially the entire cross-sectional or flow area of the column and each disc is provided with a vapor opening 12 at one edge portion thereof which may be arcuate in configuration as shown, or of any other desired shape. The size of the opening 12 will be determined by the type of liquid to be used and by the operating conditions under which its contact with vapor is effected. Generally, an arcuate opening having a radial dimension about one-half the radius of the disc, will be satisfactory, but it will be understood that this figure is mentioned by way of illustration oly and not by way of limitation of the scope of the invention. The discs are suitably assembled so that the openings 12 of adjacent discs are diametrically opposed, as shown, to provide the longest possible path of travel of the vapors in flowing upwardly through the column and the longest path of contact with the films of liquid. The diameter of the discs is such that they fit in the column snugly so that any openings between the discs and the column walls are sealed by the liquid to prevent short-circuiting of the vapor.

In certain cases it will be found that certain liquids of high surface tension tend to pass from the gauze discs to the column walls. In order to prevent such travel a peripheral or annular ring 8 as illustrated in Figs. 4 and 5 may be formed into the disc. The width of this ring may be substantially 1/16" or more in larger columns. The vapor openings may cut through this annular ring without substantially interfering with its function. In Fig. 4, each disc 15 is formed with a laterally extending annular flange 8 with a vapor opening similar to the opening 12 in the conical portion of the disc. In operation, the liquid and vapor flow is like that which is obtained with the form shown in Figs. 1 and 2, with the vapor entering each cell through inlet 16 and leaving through outlet 17. The liquid will pass from the upper disc of each cell to the lower disc at the inner peripheral portion of the annular flange 8. In Fig. 5, the lower disc 20 of each cell has a base which is coextensive with the flow area of the column 10 whereas the upper disc has a smaller base which will provide a horizontally inclined annular flange 8 for each cell when the discs are assembled base to base as shown. The operation is similar to the operation in Fig. 4, with the vapor entering each cell through inlet opening 21 and leaving through outlet opening 22. As in Fig. 4, the liquid will pass from the upper disc of each cell to the lower disc at the inner peripheral portion of the flange 8 and thus prevent flow of the liquid from the discs to the wall of the column.

In operation, the liquid introduced into the top of the column flows over the capillary material and seals the openings therein. An element 6 and an adjacent lower element 7, form a cell and liquid flows radially outwardly in the top element 6 and radially inwardly in the lower element 7 of each cell. This alternate flow on adjacent discs radially outwardly and inwardly, continues until the liquid drops off the lowermost disc in the column. The vapor entering the column at its lower portion, flows into the space between adjacent cells, a cell comprising adjacent discs which are welded together edge to edge. Within the cell the vapor flows from the inlet opening to the outlet opening which is oppositely disposed thereto in a direction transverse to the axis of the column and the packing, and flows out through the outlet opening into the annular space above the cell and below the superposed cell. Upon leaving the cell the vapor divides and flows in opposite directions through said annular space into the inlet opening of the superposed cell, wherein the vapor flows through the cell and out the outlet opening into the space immediately above. In this manner the vapor flows successively through each of the cells and between adjacent cells until the vapor passes out at the top of the column. It will be perceived that a continual contact and separation of both liquid and vapor is achieved by this method and channelling of the vapor is avoided. The lower surfaces of the discs are exposed to vapor as it flows along the surface of the capillary material, and the irregularities of the material cause turbulence in the liquid stream so that the liquid is well exposed to the vapor and the equivalent of an equilibrium contact is obtained quickly.

One suitable capillary material for the packing is stainless steel wire cloth of 40 x 60 meshes per inch woven from wire 0.009 inch in diameter. It is desirable to use a wire which is quite heavy for the mesh in order to increase the roughness of the surface as much as possible. Other metals than stainless steel may be used for particular uses, also any other capillary material which can be formed into the required shape. Other sizes of mesh may be used provided the packing has sufficient mechanical strength and the surface tension of the liquid is such that the openings of the mesh seal with liquid to prevent the passage of vapor through the mesh. The packing may be made also from sheets or plates of metal or other material which are provided with apertures adequate in size and sufficient in number for the purpose intended. The expression "capillary material" as used herein and in the claims includes perforated sheets and plates of the character mentioned. Additionally, the transverse cross-sectional configuration of the column and the corresponding configuration of the capillary material may be other than circular.

Tests of packing embodying the invention have shown that with comparable vapor velocities better efficiencies are possible than with other types of packing utilized in the art heretofore. These efficiencies are accompanied by unusually low liquid holdup and by pressure drops that compare favorably with those of other types of packing. The throughput is satisfactory also and compares well with other packings as indicated by the fact that with packings having diameters of 0.375 inch and 0.984 inch, vapor velocities of 0.71 and 0.98 feet per second respectively can be achieved.

Fig. 3 shows the results obtained by tests of a column packed with capillary material embodying the invention. The packing was 25 mm. in diameter and 24 inches in height and consisted of 73 cells, or 146 conical discs, arranged as shown in Figs. 1 and 2 of the drawing in a Pyrex glass column equipped with silvered vacuum jackets with standard ground glass joints. The column tube was selected carefully so as to properly fit the packing. A binary mixture of benzene-ethylene dichloride was used and the tests were made at atmospheric pressure with total reflux.

From other tests made with one inch inside diameter Pyrex tubing having a 36" stainless steel wire gauze packed section embodying the invention, with 36 cells per foot of height, and using a binary mixture of normal-heptane and methyl-cyclohexane as the test liquid, the column was found to have a high efficiency combined with reasonable throughput and low pressure drop per theoretical plate. This column had the equivalent of 40 theoretical plates, the height equivalent to a theoretical plate being 0.90" at distillation rates in the neighborhood of 1000 ccs. per hour. The maximum boil-up rate or throughput just under the flooding point was approximately 1350 ccs. per hour, the liquid hold-up was 45 ccs. and the pressure drop per theoretical plate was of the order of 0.2 mm. of mercury.

The foregoing data indicate clearly that a true boiling point column which employs capillary material arranged and disposed in accordance with the invention, is exceptionally well suited to the characterization studies of naphthas and other laboratory fractional distillation problems.

Inasmuch as changes may be made in the form, arrangement and material of the packing without departing from the principles of the invention, it will be understood that the invention is not to be limited excepting by the scope of the appended claims.

What is claimed is:

1. Packing for liquid and vapor contacting devices comprising capillary material, the capillary openings of which seal with liquid under treatment, arranged to provide a plurality of cells disposed in superposed relationship with adjacent cells in engagement, each cell extending throughout substantially the entire flow area of the device, each cell having transversely, substantially oppositely disposed inlet and outlet openings larger than the capillary openings to provide in the device vapor passages to and from each cell.

2. Packing for liquid and vapor contacting devices comprising capillary material, the capillary openings of which seal with liquid under treatment, arranged to provide a plurality of cells disposed at different elevations, each cell comprising two discs of capillary material of concavo-convex configuration secured together base to base, adjacent cells being secured together, each cell having a vapor inlet opening in its lower disc in its peripheral portion and a vapor outlet opening in its upper disc in its peripheral portion out of alignment axially with the vapor inlet opening, said vapor openings being larger than the capillary openings.

3. Liquid and vapor contacting apparatus comprising a column and a packing therefor of capillary material, the capillary openings of which seal with liquid under treatment, arranged to provide a plurality of cells disposed in superposed relationship, each cell extending throughout substantially the entire flow area of the column, each cell having an inlet opening and an outlet opening larger than the capillary openings to provide in the column vapor passages to and from each cell, said openings being located to cause the vapor to flow in a tortuous path in the column.

4. Liquid and vapor contacting apparatus comprising a column and a packing therefor of capillary material, the capillary openings of which seal with liquid under treatment, arranged to provide a plurality of cells disposed in superposed relationship, each cell comprising two discs of capillary material of concavo-convex configuration disposed base to base, each cell having a vapor inlet opening in its lower disc and a vapor outlet opening in its upper disc, said vapor openings being larger than the capillary openings, the vapor openings being so located that the vapor flows through the cells from the inlet to the outlet opening and between the cells from the outlet opening of one cell to the inlet opening of another cell.

5. Packing for liquid and vapor contacting devices comprising capillary material, the capillary openings of which seal with liquid under treatment, arranged to provide a plurality of cells disposed in superposed relationship, each cell extending throughout the major portion of the flow area of the device, each cell having an inlet opening and an outlet opening larger than the capillary openings to provide in the device vapor passages to and from each cell, each cell having an integral peripheral ring extending to the wall of the container for the cells.

6. Packing for liquid and vapor contacting devices comprising capillary material, the capillary openings of which seal with liquid under treatment, arranged to provide a plurality of cells disposed at different elevations, each cell having a substantially conical surface and having an inlet opening and an outlet opening larger than the capillary openings to provide in the device vapor passages to and from each cell, said openings being substantially oppositely disposed transversely of the device to cause the vapor to flow tortuously therein.

7. Packing for liquid and vapor contacting devices comprising capillary material, the capillary openings of which seal with liquid under treatment, arranged to provide a plurality of cells disposed at different elevations, each cell comprising oppositely disposed concavo-convex surfaces and having an inlet opening and an outlet opening larger than the capillary openings to provide in the device vapor passages to and from each cell, said openings being substantially oppositely disposed to cause the vapor to flow through the cells and between cells from the outlet opening of one cell to the inlet opening of another cell.

8. Packing for liquid and vapor contacting devices comprising capillary material, the capillary openings of which seal with liquid under treatment, arranged to provide a plurality of cells disposed at different elevations, each cell comprising two discs of capillary material of concavo-convex configuration disposed base to base, and having a vapor inlet opening in its lower disc and a vapor outlet opening in its upper disc, said vapor openings being larger than the capillary openings and substantially oppositely disposed to cause the vapor to flow tortuously in the device.

9. Packing for liquid and vapor contacting devices comprising capillary material, the capillary openings of which seal with liquid under treatment, arranged to provide a plurality of cells disposed at different elevations, each cell comprising two elements of capillary material of concavo-convex configuration disposed base to base, each cell having a vapor inlet and an outlet opening larger than the capillary openings to provide in the device vapor passages to and from each cell, certain of said capillary elements having a laterally extending flange at the base thereof, the outer periphery of which is substantially coextensive with the flow area of the device.

10. Packing for liquid and vapor contacting devices comprising capillary material, the capillary openings of which seal with liquid under treatment, arranged to provide a plurality of cells disposed at different elevations, each cell comprising two elements of capillary material of substantially conical configuration disposed base to base, each cell having a vapor inlet and an outlet opening larger than the capillary openings to provide in the device vapor passages to and from each cell, one of the capillary elements of certain of said cells having a base of larger area than the other element to provide a flange for said cells the outer periphery of which is substantially coextensive with the flow area of the device.

DONALD F. STEDMAN.